United States Patent [19]

Iannicelli

[11] 4,079,002
[45] Mar. 14, 1978

[54] THIN-SECTION-MATRIX MAGNETIC SEPARATION APPARATUS AND METHOD

[75] Inventor: Joseph Iannicelli, Jekyll Island, Ga.

[73] Assignee: Aquafine Corporation, Brunswick, Ga.

[21] Appl. No.: 677,129

[22] Filed: Apr. 15, 1976

[51] Int. Cl.² .......................................... B01D 17/06
[52] U.S. Cl. .................................. 210/42 S; 210/222
[58] Field of Search ............... 210/222, 223, 336, 338, 210/42; 209/214, 223, 224, 214; 55/484

[56] References Cited

U.S. PATENT DOCUMENTS

| | | | |
|---|---|---|---|
| 2,074,085 | 3/1937 | Frantz | 209/224 |
| 2,288,264 | 6/1942 | Byrd, Jr. | 209/232 |
| 2,329,893 | 9/1943 | Girard | 209/232 |
| 2,784,843 | 3/1957 | Braunlich | 210/223 X |
| 3,567,026 | 3/1971 | Kolm | 210/222 |
| 3,581,898 | 6/1971 | Tyrell | 210/222 |
| 3,627,678 | 12/1971 | Marston | 210/222 |
| 3,770,629 | 11/1973 | Nolan | 210/222 |
| 3,841,489 | 10/1974 | Combest et al. | 210/223 |
| 3,871,849 | 3/1975 | Smith | 55/484 |
| 3,964,890 | 6/1976 | Bonn | 55/484 |

Primary Examiner—Theodore A. Granger
Attorney, Agent, or Firm—Lawrence E. Laubscher

[57] ABSTRACT

Magnetic separation apparatus and method is disclosed for removing particles from a fluid-particle mixture, characterized by the provision of a plurality of parallel relatively thin-section matrix separator elements arranged within and parallel to the direction of a magnetic field, and flow establishing means for causing the mixture to flow in parallel flow paths through the matrix elements, respectively, in thickness directions transverse to the direction of the magnetic field. The matrix elements may be parallel spaced polygonal elements, or concentrically arranged annular elements. Preferably the matrix elements include a hollow non-ferromagnetic canister, and a mass of relatively short ferromagnetic fibers having a length of about 1-10 millimeters packed in the canister with a density of at least 8 percent by volume relative to the volume of the canister. Pole pieces may be provided having pole faces with projections thereon for concentrating the magnetic flux longitudinally through the longitudinally arranged matrix elements.

27 Claims, 6 Drawing Figures

THIN-SECTION-MATRIX MAGNETIC SEPARATION APPARATUS AND METHOD

BRIEF DESCRIPTION OF THE PRIOR ART

Magnetic separation apparatus for separating particles from a fluid-particle mixture are well known in the patented prior art, as evidenced, for example, by the patents to Nolan U.S. Pat. No. 3,770,629, Marston et al. U.S. Pat. Nos. 3,627,678 and 3,887,457, and Koln U.S. Pat. Nos. 3,567,026, 3,676,337, and 3,838,773. Furthermore, in the applicant's prior U.S. Pat. Nos. 3,471,011 and 3,667,689, Canadian Pat. No. 935,126, and pending U.S. application Ser. No. 340,411 filed March 12, 1973, now abandoned, high extraction magnetic separation systems are disclosed for separating impurity particles from an aqueous slurry (for example, a dispersion of crude kaolin clay in water from which minute magnetizable particles of impurities are removed).

In the aforementioned Nolan U.S. Pat. No. 3,770,629, a plurality or relatively thin matrix sections are provided which are arranged in spaced parallel relation within the transverse of a magnetic field, the mixture to be separated being fed through the matrix in a direction parallel with the magnetic field. In addition to being of a relatively complex construction which is costly to manufacture, the Nolan system exhibits appreciable magnetic flux loss since the flux is not concentrated uniformly in the matrix elements which are arranged normal to, and are spaced within, the magnetic field, thereby resulting in a loss of operating efficiency. Furthermore, since the matrices are arranged in stacked spaced relation normal to the field, they are subject to transverse compressive forces by the field, thereby requiring rigid reinforcement by the distribution network plates arranged between the spaced matrix elements.

SUMMARY OF THE INVENTION

To avoid the above and other drawbacks of the known magnetic separation systems, and in order to effect greater concentration of the magnetic flux in the matrix elements with a corresponding decrease in flux loss and corresponding increase in efficiency, the present invention was directed toward developing a simplified separator construction in which spaced parallel matrix elements are arranged within the parallel to the magnetic field, means being provided for establishing flow of the mixture to be separated in parallel flow paths through the matrices, respectively.

Accordingly, a primary object of the present invention is to provide a thin-section-matrix magnetic separation apparatus and method in which parallel spaced relatively thin matrix separation elements are arranged within and parallel to a high intensity magnetic field, means being provided for establishing parallel flow paths of a fluid-particle mixture through the matrix elements, respectively. The invention has particular utility in both wet and dry separation processes, as, for example, in separating particles of impurities from an aqueous slurry (for example, iron-mineral contaminates from an aqueous slurry of crude kaolin clay), the purification of industrial minerals such as calcium and magnesium carbonates, asbestos, zircon, bentonite and talc, the beneficating of metal ores such as copper, zinc, lead, sulphides and oxides, and the treatment of coal (such as the removal of pyrites during desulphurizing).

In accordance with a more specific object of the invention, the matrix separation or collection elements are arranged in parallel spaced relation longitudinally within a chamber contained in a housing, the housing including inlet and outlet openings at opposite ends of the chamber. The relatively thin matrix elements may be planar spaced parallel polygonal elements, or concentrically spaced annular elements. Preferably the housing and the chamber contained therein are cylindrical, the means for establishing the longitudinal magnetic field in the chamber including a coil arranged concentrically about the housing for establishing in the chamber a field the flux of which passes longitudinally through the matrix elements. The matrix elements preferably have a thickness less than about 10 inches.

In accordance with another object of the invention, pole pieces are arranged within the housing chamber at opposite ends of the matrix elements for concentrating the flow of magnetic flux longitudinally through the elements. Preferably the pole faces adjacent the ends of the matrices have projections for further concentrating the flow of magnetic flux longitudinally through the matrix elements. In the case of planar polygonal matrix elements, the pole face projections comprise linear ribs opposite the matrix element, respectively, and in the case of concentrcially arranged annular matrix elements, the pole face projections comprise concentric annular ribs opposite the matrix elements. If desired, the faces of the ribs adjacent the matrix elements may be serrated to further concentrate the magnetic flux in the matrix elements.

According to a further object of the invention, each matrix element includes a hollow non-ferromagnetic canister that contains a mass of ferromagnetic collector material, such as magnetic steel wool. The opposed walls of the canister that define the thickness dimension thereof are pervious, whereby the mixture flows in the thickness direction through the canister, and through the collecting material contained therein, in a direction transverse to the magnetic field. In accordance with an important feature of the invention, the mass of collection material comprises relatively short fibers of a ferromagnetic material, such as magnetic steel wool fibers, the lengths of said fibers being between 1 to 10 millimeters. Preferably the fibers are packed with a density of at least 8% by volume of the canister. Owing to the longitudinal arrangement of the relatively thin matrix elements in the magnetic field, the flow of magnetic flux through the densely packed short fibers is concentrated in efficient manner with extremely low flux loss.

In accordance with an important feature of the invention, the mixture can flow in parallel flow paths through the relatively thin matrix elements with a low pressure drop and a relatively short retention time, thereby improving the separation process because of lower viscous drag on the magnetically trapped particles. Thus, as compared to the recent prior art systems, the apparatus of the present invention affords lower velocities at equal retention times, or equal velocities at lower retention times. The use of more concentrated slurries is permitted than in the separation systems of the prior art. Alternatively, the use of a more densely packed matrix is permitted than those previously used. By using a plurality of thin sections, it is possible to optimize dimensions of the separating zone and yet construct large separators having the most efficient combination of dimensions. By using thin section matrix elements, maximum utilization is made of the magnetic separation effect which occurs at the interface between the plenum and the matrix elements. Moreover, it is possible to achieve very slow linear velocity of mixture flow and thereby much greater extraction efficiency. Reduction of flow velocity is accomplished without reducing the overall throughput proportionately. By means of the present invention, it is possible to achieve very low flow velocities at short retention times.

DESCRIPTION OF THE FIGURES

Other objects and advantages of the invention will become apparent from a study of the following description when viewed in the light of the accompanying drawing, in which.

DETAILED DESCRIPTION

Figure 1:
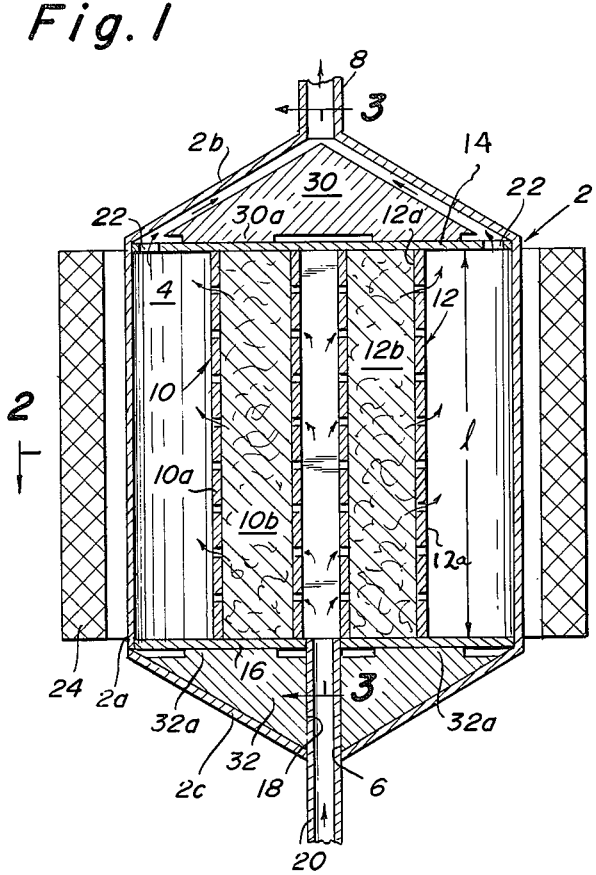
FIG. 1 is a longitudinal sectional view of a first embodiment of the invention including a pair of parallel, spaced, planar polygonal matrix elements.
Figure 3:
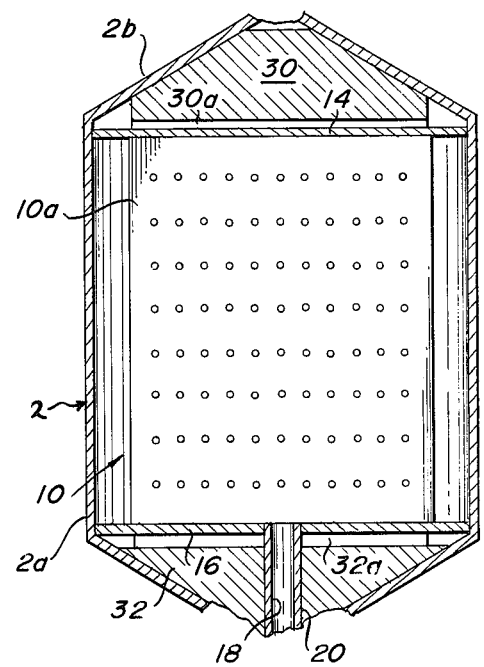
FIGS. 2 and 3 are sectional views taken along lines 2—2 and 3—3 of FIG. 1.
Figure 2:
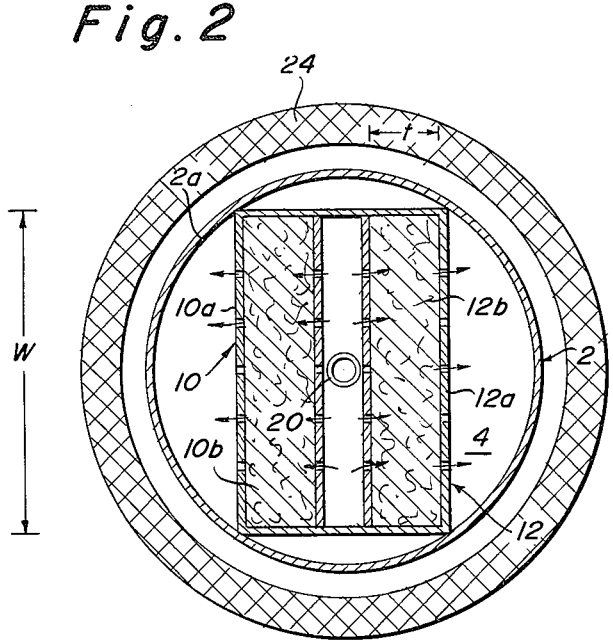

Referring first more particularly to FIGS 1-3, the magnetic separation apparatus of the present invention includes a cylindrical housing 2 which contains a cylindrical chamber 4, said housing including at its lower and upper ends inlet and outlet openings 6 and 8, respectively. Mounted within the housing chamber 4 are a pair of matrix separator or collector elements 10 and 12 which are of polygonal configuration. The matrix elements are arranged in parallel spaced relation with their length dimensions 1 extending longitudinally of the housing chamber 4. Arranged at the upper and lower ends of the matrix element are isolation plates 14 and 16 which isolate the housing chamber 4 from the inlet and outlet openings 6 and 8, respectively. The lower isolating plate 16 contains a central aperture 18 through which the mixture to be separated is supplied into the space between matrix elements 10 and 12. Similarly, the isolation plate 14 contains apertures 22 which afford communication between the spaces adjacent the remote surfaces of the matrix elements 10 and 12 and the housing outlet 8. Means including an annular coil 24 arranged concentrically about the housing 2 are provided for establishing a high intensity magnetic field which extends longitudinally through the housing chamber 4 and longitudinally through the matrix elements 10 and 12 contained therein. In order to further concentrate the longitudinal flow of flux through the housing chamber 4, ferromagnetic pole pieces 30 and 32 are arranged at the upper and lower ends of the housing chamber in engagement with the isolating plate means 14 and 16. In accordance with an important feature of the invention, the pole faces of the pole pieces 30 and 32 include linear rib portions 30a and 32a, respectively, that are arranged opposite and parallel with the matrix elements 10 and 12.

Each of the matrix elements 10 and 12 comprises a hollow canister 10a and 12a that is filled with a suitable ferromagnetic particle collecting mass 10b and 12b, as for example magnetizable steel wool. In accordance with an important feature of the invention, the particle collecting masses are preferably formed of relatively short fibers of a ferromagnetic material. More particularly, the length of the ferromagnetic short fibers is preferably in the range of 1-10 millimeters, as produced, for example, by micro-pulverizing 430 magnetic stainless steel wool in a hammer mill or similar device. Preferably the ferromagnetic particle collecting fibers are packed in the canisters with a relatively high density, i.e., with a density of at least 8 percent by volume relative to the volume of the canisters.

As shown in FIGS. 1 and 2, the matrix elements 10 and 12 are of generally rectangular configuration, said matrix elements being arranged with their length dimension 1 extending longitudinally of the housing chamber 4. In accordance with the present invention, each of the matrix elements has a relatively thin thickness dimension $t$ with regard to the width and length dimensions $w$ and $l$. Preferably the thickness dimensions $t$ of each matrix element is less than about 10 inches. The parallel faces of the canisters 10a and 12a which define the thickness dimensions of the matrix elements are perforated to permit the flow of the mixture to be separated in the thickness direction through the matrix elements.

Preferably the housing 2 includes separable cylindrical body and coincal top and bottom portions 2a, 2b, and 2c, respectively. The pole pieces 30 and 32 and the isolating plate means 14 and 16 are removably mounted in the housing chamber to permit access to the matrix elements 10 and 12 for servicing. The pole pieces 30 and 32, the isolating plate means 14 and 16, and the collector masses 10b and 12b are each formed of a suitable ferromagnetic material, and the remaining components (such as the housing 2 and the canisters 10a and 12a) are formed of a suitable non-ferromagnetic material, such as non-magnetic stainless steel. Preferably the high intensity magnetic field established in the housing chamber 4 by the coil 24 has an intensity of from 7,000 to 20,000 gauss, and preferably greater than 8,500 gauss.

OPERATION

In operation, assume that the coil 24 is energized to establish the high intensity magnetic field which extends longitudinally through the housing chamber 4 and the matrix elements 10 and 12, and that a mixture (such as an aqueous slurry of a crude kaolin clay dispersed in water) is supplied to the housing chamber 4 via supply conduit 20, inlet opening 6, and aperture 18. The mixture fills the space between the matrix elements 10 and 12 and then passes through the matrix elements in the direction of the thickness dimension thereof normal to the direction of the high intensity magnetic field the flux of which is passing longitudinally through the matrix elements. The mixture then fills the spaces between the remote surfaces of the matrix elements and the cylindrical wall surface of the chamber 4 and flows to the housing outlet 8 via the apertures 22 contained in isolating plate 14. The magnetizable impurity particles contained in the slurry are retained by magnetic attraction on the fibers of the collecting masses 10b and 12b contained in the canisters 10a and 12a. It will be seen, therefore, that the mixture flows in parallel flow paths in the thickness direction through the matrix elements transverse to the direction of the magnetic field which is directed longitudinally through the housing chamber 4. As is common in the art, the supply of the mixture is then interrupted, and residual slurry is rinsed from the apparatus by a gentle flow of water. The coil 24 is then de-energized to interrupt the magnetic field and the flow of flux longitudinally through the matrix elements, whereupon water is forced through the matrix elements to flush the particles of impurities which are collected on the fibers of the collector masses 10b and 12b out of the housing via outlet opening 8.

Figure 4:
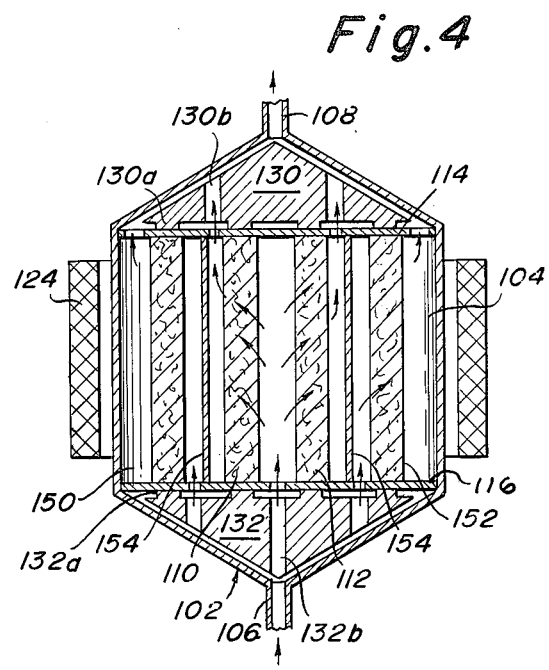
FIG. 4 is a sectional elevation view of a modification bodiment of the invention including a pair of parallel, spaced, planar polygonal matrix elements.
Figure 5:
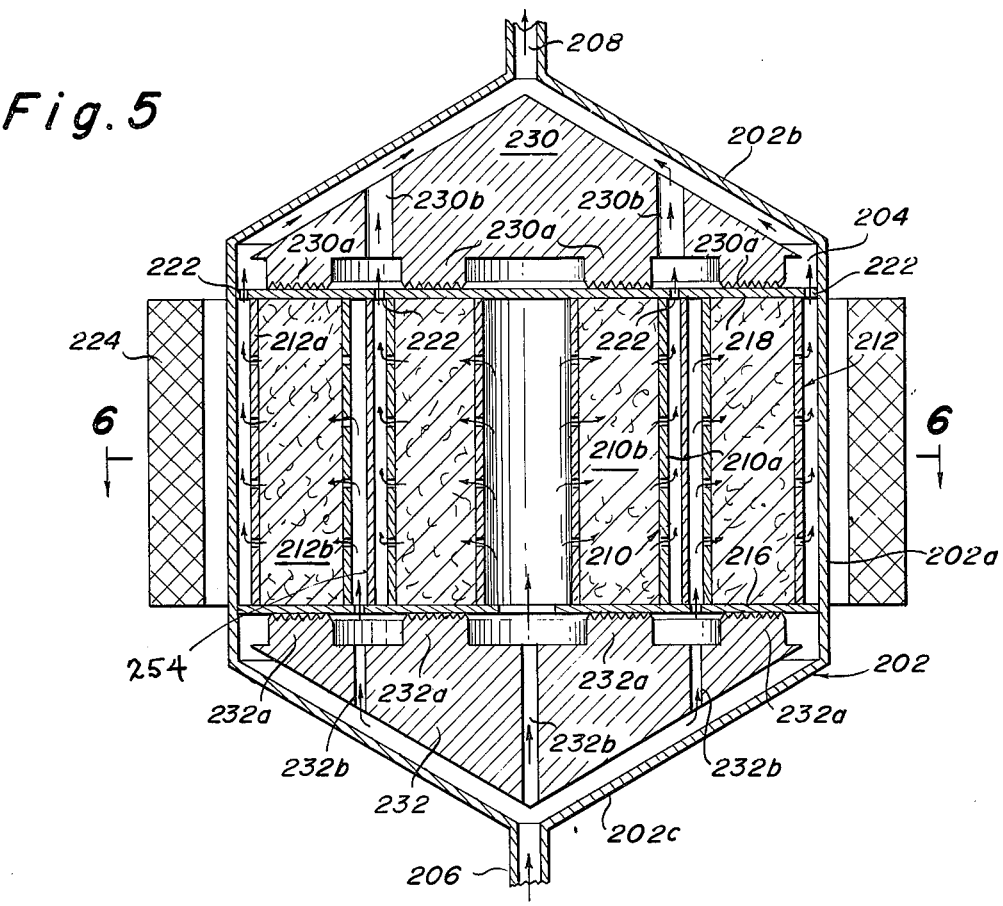
FIG. 5 is a longitudinal sectional view of a second embodiment of the invention including annular concentrically spaced matrix elements.
Figure 6:
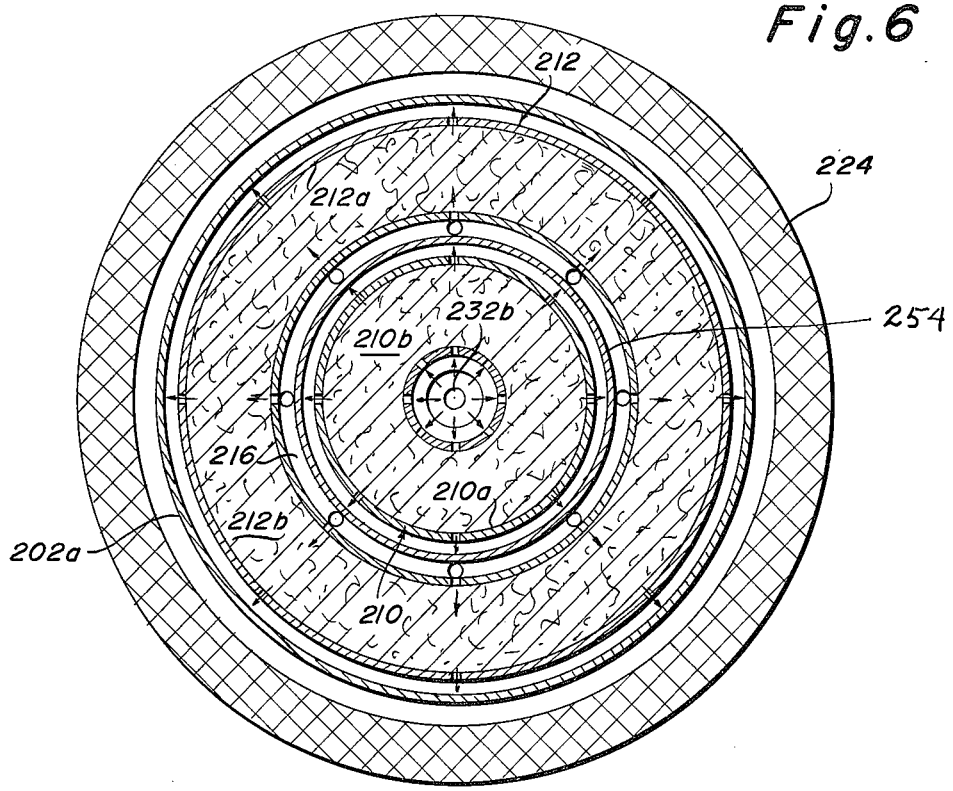
FIG. 6 is a sectional view taken along line 6—6 of FIG. 5.

While only two parallel spaced relatively thin polygonal matrix elements have been illustrated in the embodiment of FIGS. 1-3, it will be apparent that in accordance with the present invention, a plurality of parallel spaced polygonal matrix elements could be provided. As shown in FIG. 4, when a plurality of the polygonal matrix elements 110, 112, 150 and 152 are provided, non-ferromagnetic planar divider plates 154 are provided in spaced parallel relation between the matrix elements on opposite sides of the center line of the housing chamber 104. The isolating plates 114 and 116 contain apertures which are so arranged that the spaces on one side of the matrix elements communicate with the housing opening 106, and the spaces on the other sides of the matrix elements communicate with the housing outlet opening 108. The pole pieces may be provided with corresponding longitudinally extending passages to assist in the flow of the mixture through the apparatus. Thus, the mixture flows into the chamber 104 via the inlet opening 106 and the passages 132b and the apertures contained in the isolating plate 116 into the appropriate spaces on one side of the matrix elements. The mixture then flows in parallel paths in the thickness direction through the polygonal matrix elements in a direction transverse to the magnetic field established in the housing chamber 104 by the coil means 124, and out from the housing chamber via the apertures contained in isolating plate 114, passages 130b and the outlet opening 108. As in the embodiment of FIGS. 1-3, the pole pieces 130 and 132 include pole faces which are provided with projecting ribs 130a and 132a opposite the matrix elements, whereby the flow of magnetic flux is concentrated longitudinally through the matrix elements 110, 112, 150 and 152.

In acccordance with a second embodiment of the invention, the thin-section matrix elements are annular and are arranged in concentrically spaced relation within the housing chamber. More particularly, the housing 202 is of cylindrical construction and includes a cylindrical chamber 204 in which are arranged in concentrically spaced relation a pair of annular matrix elements 210 and 212. Arranged in concentrically spaced relation between the matrix elements is an annular impervious separator plate 254 that is formed of a suitable non-ferromagnetic material, such as nonmagnetic stainless steel. A lower isolating plate 216 formed of a suitable ferromagnetic material is provided containing apertures which afford communication between the spaces on one side of the matrix elements with the inlet opening 206, and an upper isolating plate 218 formed of a suitable ferromagnetic material containing apertures which afford communication between the spaces on the other sides of the matrix elements with the housing outlet opening 208. To facilitate the flow of the mixture through the apparatus, the upper and lower pole pieces 230 and 232 are provided with appropriate longitudinal passages 230b and 232b, respectively. In accordance with the present invention, means including the concentrically arranged annular coil 224 is provided for establishing a magnetic field that extends longitudinally through the housing chamber 204 and longitudinally through the matrix elements 210 and 212. In order to concentrate the flow of magnetic flux of the field longitudinally through the matrix elements 210 and 212, the faces of the pole pieces 230 and 232 are provided with concentrically arranged annular ribs 230a and 232a, respectively, opposite the matrix elements.

As in the previous embodiment, the matrix elements include hollow canisters 210a and 212a formed of a non-ferromagnetic material, and masses of ferromagnetic fibers 210b and 212b, respectively. Preferably the fibers have a relatively short length (in the range of 1-10 millimeters) as obtained, for example, by micropulverizing 430 magnetic stainless steel wool in a hammer mill. Furthermore, the fibers are preferably packed with a density of at least 8 percent by volume relative to the volume of the corresponding canister.

In operation, the mixture flows into the spaces on one side of the matrix elements in parallel flow paths from housing opening 206 via the longitudinal passages 132b contained in the lower pole piece 232 and the apertures contained in the isolating plate 216. The mixture then flows through the pervious inner wall of the canisters, through the ferromagnetic masses 210b and 212b in the thickness direction of the matrix elements transverse to the longitudinal magnetic field concentrated in the matrix elements, and outwardly through the pervious outer walls of the matrix elements. The mixture then flows to the housing outlet 208 from the spaces on the outer sides of the matrix elements via apertures contained in the upper isolating plate 218 and the longitudinal passages 230b contained in the upper pole piece 230 and also the space between the upper pole piece 230 and the housing upper end portion 202b.

While in both embodiments the inlet and outlet openings have been illustrated as being at the lower and upper ends of the housing, respectively, it is apparent that the inlet and outlet openings might be reversed so that the mixture flows in the opposite direction through the separation apparatus. The actual number of planar polygonal or concentrically arranged annular matrix elements may be greatly increased depending on the size of the separation apparatus, the only consideration bing that the thickness dimension of each matrix element should be less than about 10 inches.

As an alternative to the mode of operation described above, the supply of the mixture may be interrupted, whereupon the residual slurry is rinsed from the apparatus by a gentle flow of water. The water in the canister is displaced with compressed air, the magnet is de-energized, and the container is flushed. Before starting the supply of mixture again, it may also be desirable to displace the water in the canister from the flush step by means of compressed air.

While in accordance with the provisions of the Patent Statutes the preferred forms and embodiments of the invention have been illustrated and described, it will be apparent to those skilled in the art that various changes and modifications may be made in the apparatus described without deviating from the inventive concepts set forth above.

What is claimed is:

1. The method for separating from a fluid-particle mixture particles having a given degree of magnetic susceptibility relative to the magnetic susceptibility of the remaining matter, which comprises the steps of
    (a) supplying the mixture to the inlet opening of a chamber containing a plurality of parallel spaced ferromagnetic matrix separator elements, each of said matrix elements having a thickness dimension which is smaller than its other dimensions, said matrix element including a hollow body containing a mass of ferromagnetic particles, the opposed walls of said body defining the thickness dimension of the matrix element being pervious, the density of said mass of particles being greater than 8 percent volume relative to the volume of the body, said chamber containing a pair of pole members arranged at opposite ends of said matrix separator elements, respectively;

(b) directing a high intensity magnetic field through said chamber in a direction between said pole members parallel with the longitudinal axes of said matrix elements, whereby the direction of the magnetic field is normal to the thickness dimension of each of said matrix elements; and (c) causing said mixture to flow in parallel flow paths through said matrix elements in the direction of the thickness dimension thereof transverse to the magnetic field, and out of said chamber through an outlet opening thereof, whereby the particles are retained on said matrix elements, whereby the length of the flow path between the inlet and outlet openings may be varied relative to the fixed gap between the pole members.

2. The method as defined in claim 1, and further including the steps of (d) rinsing residual mixture from the chamber;

(e) interrupting the magnetic field; and (f) flushing from the matrix elements the particles which are collected thereon.

3. The method as defined in claim 1, wherein said chamber is cylindrical, and wherein said elements and said magnetic field extend longitudinally of the chamber.

4. The method as defined in claim 3, wherein said matrix elements are annular and are arranged in concentrically spaced relation within, and concentrically spaced from the cylindrical wall of, the chamber.

5. The method as defined in claim 1, wherein said matrix elements are generally planar polygonal elements.

6. The method as defined in claim 5, wherein said matrix elements are rectangular, the elements being arranged with their length dimensions extending longitudinally of the chamber.

7. The method as recited in claim 1, wherein each of the matrix elements includes a mass of short ferromagnetic fibers the lengths of which are between about 1 to 10 millimeters.

8. The method as defined in claim 1, and further including the steps of (d) interrupting the mixture and rinsing the residual mixture from the chamber with a gentle flow of water;

(e) introducing compressed air in the chamber to remove the remaining liquid therefrom;

(f) interrupting the magnetic field;

(g) flushing from the matrix elements the particles which are collected thereon; and (h) repeating step (e).

9. Thin-section-matrix magnetic separation apparatus for separating from a fluid-particle mixture particles having a given degree of magnetic susceptibility, comprising (a) a housing containing a chamber and including at opposite ends inlet and outlet openings communicating with said chamber;

(b) means for establishing a high intensity magnetic field which extends longitudinally across said housing chamber, said magnetic field establishing means including ferromagnetic pole members arranged at opposite ends of said chamber;

(c) matrix separation means arranged longitudinally in said housing chamber within said magnetic field, said matrix means including a plurality of parallel spaced linear polygonal ferromagnetic matrix separation elements extending longtudinally of said housing generally parallel with said magnetic field, each of said elements having a thickness dimension that is small relative to the other dimensions of the element;

(d) means for concentrating the flow of magnetic flux longitudinally through said matrix elements, comprising linear rib means arranged on the adjacent faces of said pole members, respectively, said rib means being directly opposite and extending parallel with said matrix elements, respectively; and (e) means for establishing the flow of the mixture from the chamber inlet opening to the chamber outlet opening:

(1) initially in a longitudinal direction parallel with the magnetic field;

(2) subsequently in parallel flow paths transversely through said matrix elements in a direction normal to the magnetic field; and (3) finally in a direction parallel with the magnetic field, whereby the particles are retained on said matrix elements during the flow of mixture through said chamber.

10. Thin-section-matrix magnetic separation apparatus for separating from a fluid-particle mixture particles having a given degree of magnetic susceptibility, comprising (a) a housing containing a chamber and including at opposite ends inlet and outlet openings communicating with said chamber;

(b) means for establishing a high intensity magnetic field which extends longitudinally across said housing chamber, said magnetic field establishing means including ferromagnetic pole members arranged at opposite ends of said chamber;

(c) matrix separation means arranged longitudinally in said housing chamber within said magnetic field, said matrix means including a plurality of concentrically spaced annular ferromagnetic matrix separation elements extending longitudinally of said housing generally parallel with said magnetic field, each of said elements having a thickness dimension that is small relative to the other dimensions of the element;

(d) means for concentrating the flow of magnetic flux longitudinally through said matrix elements, comprising concentric annular rib means arranged on the adjacent faces of said pole members, respectively, said rib means being directly opposite said matrix elements, respectively;

(e) means for establishing the flow of the mixture from the chamber inlet opening to the chamber outlet opening:

(1) initially in a longitudinal direction parallel with the magnetic field;

(2) subsequently in parallel flow paths transversely through said matrix elements in a direction normal to the magnetic field; and (3) finally in a direction parallel with the magnetic field, whereby the particles are retained on said matrix elements during the flow of mixture through said chamber.

11. Thin-section-matrix magnetic separation apparatus for separating from a fluid-particle mixture particles having a given degree of magnetic susceptibility, comprising
   (a) a housing containing a chamber and including at opposite ends inlet and outlet openings communicating with said chamber;
   (b) means including a coil arranged concentrically about said housing for establishing a high intensity magnetic field which extends longitudinally through said housing chamber, and ferromagnetic pole members arranged at opposite ends of said housing chamber;
   (c) matrix separation means arranged longitudinally in said housing chamber within said magnetic field, said matrix means including a plurality of parallel spaced ferromagnetic matrix separation elements extending generally parallel with said magnetic field, each of said elements comprising
      (1) a hollow canister formed of a non-ferromagnetic material, and
      (2) a mass of short ferromagnetic fibers filling said canister,
      (3) the thickness dimension of said canister being small relative to the other dimensions thereof, the walls of said canister which define the thickness dimension of the matrix element being pervious to permit the flow of the mixture through the matrix element in the direction of the thickness dimension thereof; and
   (d) means for establishing the flow of the mixture from the chamber inlet opening to the chamber outlet opening
      (1) initially in a longitudinal direction parallel with the magnetic field;
      (2) subsequently in parallel flow paths transversely through said matrix elements in a direction normal to the magnetic field, and
      (3) finally in direction parallel with the magnetic field, whereby the particles are retained on said matrix elements during the flow of mixture through said chamber.

12. Apparatus as defined in claim 11, wherein the length of said ferromagnetic fibers is on the order of 1-10 millimeters, and further wherein the density of the fiber mass in said canister is greater than 8% by volume relative to the volume of the canister.

13. Apparatus as defined in claim 12, wherein said ferromagnetic fibers comprise micro-pulverized magnetic stainless steel wool.

14. Thin-section-matrix magnetic separation apparatus for separating from a fluid-particle mixture particles having a given degree of magnetic susceptibility, comprising
   (a) a housing containing a chamber and including at opposite ends inlet and outlet openings communicating with said chamber;
   (b) means for establishing a high intensity magnetic field which extends longitudinally across said housing chamber, said magnetic field establishing means including coil means arranged in concentrically spaced relation about said housing, and ferromagnetic pole members arranged at opposite ends of said housing chamber, said magnetic field having an intensity of at least 8500 gauss;
   (c) matrix separation means arranged longitudinally in said housing chamber within said magnetic field, said matrix means including a plurality of parallel spaced ferromagnetic matrix separation elements extending longitudinally of said housing generally parallel with said magnetic field, each of said elements having a thickness dimension that is small relative to the other dimensions of the element; and
   (d) means for establishing the flow of the mixture from the chamber inlet opening to the chamber outlet opening
      (1) initially in a longitudinal direction parallel with the magnetic field;
      (2) subsequently in parallel flow paths transversely through said matrix elements in a direction normal to the magnetic field, and
      (3) finally in a direction parallel with the magnetic field, whereby the particles are retained on said matrix elements during the flow of mixture through said chamber.

15. Thin-section-matrix magnetic separation apparatus for separating from a fluid-particle mixture particles having a given degree of magnetic susceptibility, comprising
   (a) a cylindrical housing containing a chamber and including at opposite ends inlet and outlet openings communicating with said chamber, said housing being arranged with its longitudinal axis extending vertically;
   (b) means for establishing a high intensity magnetic field which extends longitudinally across said housing chamber;
   (c) matrix separation means arranged longitudinally in said housing chamber within said magnetic field, said matrix means including a plurality of parallel concentrically spaced annular ferromagnetic matrix separation elements extending longitudinally of said housing generally parallel with said magnetic field, each of said elements having a thickness dimension that is small relative to the other dimensions of the element;
   (d) impervious annular divider elements arranged in concentrically spaced relation between successive annular matrix elements, respectively; and
   (e) means for establishing the flow of the mixture from the chamber inlet opening to the chamber outlet opening
      (1) initially in a longitudinal direction parallel with the magnetic field;
      (2) subsequently in parallel flow paths transversely through said matrix elements in a direction normal to the magnetic field, and
      (3) finally in a direction parallel with the magnetic field, whereby the particles are retained on said matrix elements during the flow of mixture through said chamber,
      (4) said flow establishing means including a pair of planar isolating plate means arranged at opposite ends of said matrix elements for isolating the annular chambers between said matrix and divider elements from said housing inlet and outlet openings, respectively, one of said isolating plate means containing apertures affording communication between one of said housing inlet and outlet openings and the annular spaces adjacent one side of the matrix elements, respectively, the other of said isolating plate means containing apertures affording communication between the other of said housing inlet and outlet openings and the annular spaces on the other side of each of said matrix elements, respectively.

16. Apparatus as defined in claim 15, wherein said isolating plate means are each formed of a ferromagnetic material.

17. Thin-section-matrix magnetic separation apparatus for separating from a fluid-particle mixture particles having a given degree of magnetic susceptibility, comprising (a) a housing containing a chamber and including inlet and outlet openings adjacent the lower and upper ends of said chamber;

(b) matrix separation means arranged within said housing chamber, said matrix separation means comprising at least one matrix element including a relatively-thin hollow body, and a mass of ferromagnetic particles filling said body, said matrix element being arranged with its length and thickness dimensions extending vertically and horizontally, respectively, the vertical walls of said body being pervious;

(c) means for establishing a high intensity magnetic field extending vertically through said chamber, said field establishing means including (1) a pair of ferromagnetic pole members arranged below and above said matrix element adjacent said inlet and outlet openings, respectively, and (2) annular coil means arranged concentrically about said housing, said coil means being horizontally arranged for establishing a magnetic field extending vertically through said matrix element between said pole members; and (d) means for establishing flow of the liquid particle mixture from said inlet opening to said outlet opening (1) initially vertically in a direction parallel with the magnetic field, (2) subsequently horizontally in parallel horizontal flow paths through said matrix element in the direction of the thickness dimension thereof normal to the magnetic field, and (3) finally vertically in a direction parallel with the magnetic field, whereby the particles of the mixture are retained on the matrix element during the flow of the mixture through the chamber, whereby the length of the flow path between the inlet and outlet openings may be varied relative to the fixed gap between the pole members.

18. Apparatus as defined in claim 17, wherein a plurality of matrix elements are provided each having a thickness dimension less than about 10 inches.

19. Apparatus as defined in claim 18, wherein each of said matrix elements has a generally planar polygonal configuration.

20. Apparatus as defined in claim 18, wherein said matrix elements are annular and are arranged in concentrically spaced relation relative to the vertical axis of said housing chamber and spaced from the adjacent wall of the housing chamber.

21. Apparatus as defined in claim 18, wherein the faces of said pole members adjacent the ends of said matrix elements include means for concentrating the flow of magnetic flux longitudinally through said matrix elements, respectively.

22. Apparatus as defined in claim 18, wherein said matrix elements are of rectangular configuration, said matrix elements being parallel, spaced and arranged with their length dimensions extending vertically and with their width dimensions extending horizontally.

23. Apparatus as defined in claim 18, wherein said mixture flow establishing means includes first means affording communication between one of said inlet and outlet openings and the space adjacent one thickness-defining face of each of the matrix elements, respectively, and second means affording communication between the other of said inlet and outlet openings and the space adjacent the other thickness-defining face of each of said matrix elements, respectively.

24. Apparatus as defined in claim 23, wherein said of each first and second flow establishing means comprises a horizontal plate seated on the ends of said matrix elements and extending in said housing chamber normal to the direction of the magnetic field, said plate containing openings arranged for the flow of the mixture therethrough.

25. Apparatus as defined in claim 24, and further including planar non-ferromagnetic divider elements arranged in parallel spaced relation between at least some of said matrix elements and extending vertically between said flow establishing plates, and further including pole means for concentrating the flow of flux of said magnetic field longitudinally through said matrix elements.

26. Apparatus as defined in claim 17, wherein said mass of ferromagnetic particles comprises a mass of ferromagnetic fibers having lengths between 1 to 10 millimeters.

27. Apparatus as defined in claim 26, wherein said mass of short fibers is packed in said hollow canister with a density of at least 8 percent volume of fibers relative to the volume of the canister chamber.

* * * * *